(12) United States Patent
Libera et al.

(10) Patent No.: US 8,291,715 B2
(45) Date of Patent: Oct. 23, 2012

(54) BI-MODAL TURBINE ASSEMBLY AND STARTER / DRIVE TURBINE SYSTEM EMPLOYING THE SAME

(75) Inventors: Tony Libera, Tempe, AZ (US); Peter Zeiner, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1305 days.

(21) Appl. No.: 12/137,303

(22) Filed: Jun. 11, 2008

(65) Prior Publication Data

US 2009/0314002 A1  Dec. 24, 2009

(51) Int. Cl.
*F02C 7/277* (2006.01)
*F02C 7/32* (2006.01)
*F02C 6/08* (2006.01)

(52) U.S. Cl. .................... 60/788; 60/39.183; 60/802
(58) Field of Classification Search ............. 60/39.183, 60/802, 787, 788
See application file for complete search history.

(56) References Cited

U.S. PATENT DOCUMENTS

| | | | |
|---|---|---|---|
| 2,999,356 A * | 9/1961 | Ferguson, Jr. | .................. 60/788 |
| 3,290,963 A * | 12/1966 | Oldfield et al. | ................ 60/788 |
| 3,965,673 A | 6/1976 | Friedrich | |
| 4,077,202 A | 3/1978 | Schutze | |
| 4,494,372 A | 1/1985 | Cronin | |
| 4,542,722 A | 9/1985 | Reynolds | |
| 4,979,362 A | 12/1990 | Vershure, Jr. | |
| 5,490,645 A | 2/1996 | Woodhouse | |
| 6,305,156 B1 | 10/2001 | Lui | |
| 7,059,136 B2 | 6/2006 | Coffinberry | |
| 7,104,072 B2 | 9/2006 | Thompson | |
| 7,116,003 B2 | 10/2006 | Hoppe | |
| 7,250,688 B2 | 7/2007 | Thomson et al. | |
| 7,584,600 B2 * | 9/2009 | Klingels | ................... 60/39.183 |
| 2005/0188704 A1 | 9/2005 | Butt | |
| 2007/0017226 A1 * | 1/2007 | Butt et al. | ...................... 60/802 |
| 2007/0029804 A1 | 2/2007 | Nelson | |

* cited by examiner

*Primary Examiner* — Ted Kim
(74) *Attorney, Agent, or Firm* — Ingrassia Fisher & Lorenz, P.C.

(57) ABSTRACT

A bi-modal turbine assembly is provided for use in conjunction with a gas turbine engine. In one embodiment, the bi-modal turbine assembly includes a housing assembly having a flow passage therethrough, a turbine wheel rotatably mounted in the housing assembly and positioned so as to be driven by pressurized air flowing through the flow passage, an output shaft rotatably mounted in the housing assembly, and first and second gear trains disposed in the housing assembly. A switching device is also disposed in the housing assembly and configured to mechanically couple: (i) the first gear train between the turbine wheel and the output shaft in a first operational mode, and (ii) the second gear train between the turbine wheel and the output shaft in a second operational mode.

11 Claims, 3 Drawing Sheets

BI-MODAL TURBINE ASSEMBLY AND STARTER / DRIVE TURBINE SYSTEM EMPLOYING THE SAME

TECHNICAL FIELD

The present invention relates generally to aircraft propulsion systems and, more particularly, to a starter/drive turbine system employing a bi-modal turbine assembly suitable for extracting power from a gas turbine engine.

BACKGROUND

An air turbine starter (ATS) is a well-known device utilized to initiate spool rotation of an aircraft's gas turbine engine during main engine start (MES). A generalized ATS includes a housing assembly having a flow passage therethrough, a turbine wheel rotatably mounted in the housing assembly, an ATS output shaft, and a gear train mechanically coupled between the turbine wheel and the output shaft. Notably, the ATS housing assembly may comprise multiple individual housings or modules fixedly joined together. These housing may include, for example, a turbine module housing containing the turbine wheel. The ATS output shaft is mechanically coupled to a spool (e.g., the high pressure spool) of a gas turbine engine through an accessory gearbox mounted to the engine's exterior. During MES, pressurized air supplied to an inlet flows through the ATS flow passage and causes the turbine wheel to rotate from rest to starter cutout at a relatively high rate of speed (e.g., 70,000 to 120,000 revolutions per minute). The rotating turbine wheel drives the engine spool through the gear train, ATS output shaft, and accessory gearbox. As the engine spool rotates, so too does the turbine (or turbines) mounted to the engine spool. When the rotational rate of the turbine is sufficient to maintain a minimum airflow through the gas turbine engine, the gas turbine engine is started and the ATS is deactivated. During a typical MES procedure, the ATS may be active for a total of approximately 30 to 60 seconds. After MES, the ATS generally remains inactive for the remainder of the flight.

In addition to producing thrust, an aircraft's gas turbine engine may also be relied upon to provide electrical power. In particular, an electrical generator may be mounted to the accessory gearbox and driven by the gas turbine engine during normal operation. The electrical output produced by generator may then be routed to various electrical systems aboard the aircraft. When a gas turbine engine is utilized to drive an electrical generator in this manner, the electrical output of the generator is generally dictated by the core speed of the gas turbine engine or, more specifically, the rotational rate of the spool to which the generator is mechanically coupled. When the gas turbine engine produces relatively little thrust, such as during ground idle or descent, the speed of the gas turbine engine may be relatively low. In such instances, the electrical output of the generator is reduced. Although the speed of the gas turbine engine may be increased to augment the electrical output of the generator, this typically results in the production of a high forward thrust. The forward thrust may be reduced by dumping a portion of the air discharged from the gas turbine engine's turbine or turbines overboard; however, this practice still results in a net energy loss and is consequently inefficient.

Considering the above, it should be appreciated that it would be desirable to provide a starter/drive turbine system capable of providing a relatively efficient energy distribution between the low propulsion requirements of a gas turbine engine and the electrical load placed on an electrical generator. It would also be desirable if such a system employed a bi-modal turbine assembly capable of starting the gas turbine engine during MES and, thus, could replace a conventional ATS to reduce overall cost, part count, and weight. Other desirable features and characteristics of the present invention will become apparent from the subsequent Detailed Description and the appended claims, taken in conjunction with the accompanying drawings and this Background.

BRIEF SUMMARY

A bi-modal turbine assembly is provided for use in conjunction with a gas turbine engine. In one embodiment, the bi-modal turbine assembly includes a housing assembly having a flow passage therethrough, a turbine wheel rotatably mounted in the housing assembly and positioned so as to be driven by pressurized air flowing through the flow passage, an output shaft rotatably mounted in the housing assembly, and first and second gear trains disposed in the housing assembly. A switching device is also disposed in the housing assembly and configured to mechanically couple: (i) the first gear train between the turbine wheel and the output shaft in a first operational mode, and (ii) the second gear train between the turbine wheel and the output shaft in a second operational mode.

A starter/drive turbine (SDT) system is further provided for use in conjunction with a gas turbine engine deployed on an aircraft. In one embodiment, the SDT system includes a bi-modal turbine assembly comprising a housing assembly having a flow passage therethrough, a turbine wheel rotatably mounted in the housing assembly and positioned so as to be driven by pressurized air flowing through the flow passage, an output shaft rotatably mounted in the housing assembly, first and second gear trains disposed in the housing assembly, and a switching device disposed in the housing assembly and configured to selectively coupled the first gear train and the second gear train between the turbine wheel and the output shaft. A controller is operatively coupled to the switching device and configured to cause the switching device to mechanically couple: (i) the first gear train between the turbine wheel and the output shaft in a Start Mode, and (ii) the second gear train between the turbine wheel and the output shaft in an Energy Conservation Mode.

A method is further provided for operating a bi-modal turbine assembly of the type that includes a housing assembly, an output shaft rotatably mounted to the housing assembly, a turbine wheel disposed in a flow passage formed through the housing assembly, a first gear train disposed in the housing assembly and having a first gear ratio, and a second gear train disposed in the housing assembly and having a second gear ratio less than the first gear ratio. The method includes the steps of mechanically coupling the first gear train between the turbine wheel and the output shaft in a Start Mode, and mechanically coupling the second gear train between the turbine wheel and the output shaft in an Energy Conservation Mode.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
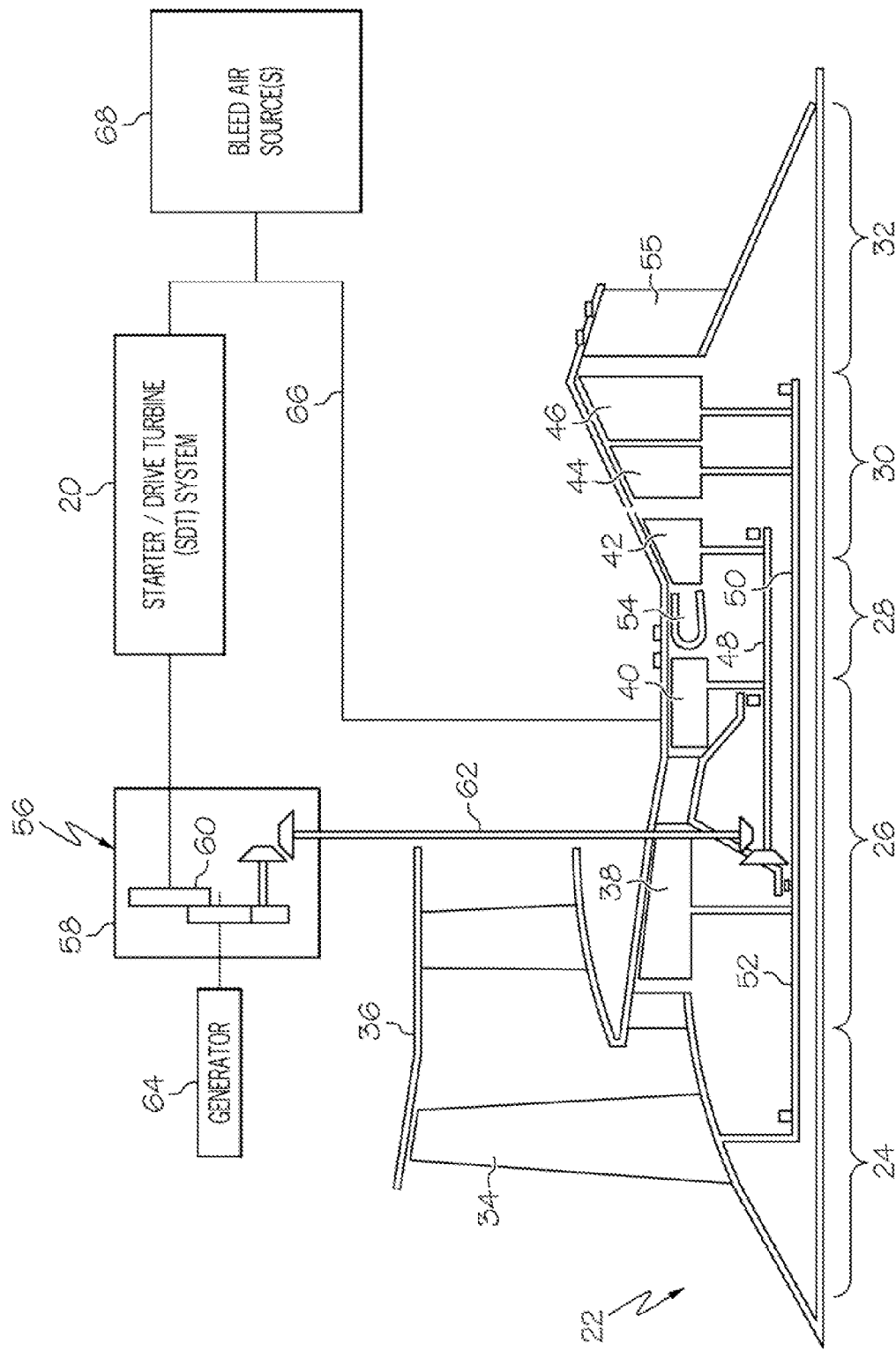
FIG. 1 is a functional schematic of a starter/drive turbine (SDT) system deployed in conjunction with a gas turbine engine in accordance with an exemplary embodiment.

FIG. 1 is a functional schematic of a starter/drive turbine (SDT) system 20 deployed in conjunction with a gas turbine engine 22 in accordance with an exemplary embodiment. As a non-limiting example, gas turbine engine 22 is illustrated in FIG. 1 as a three spool turbofan engine including an intake section 24, a compressor section 26, a combustion section 28, a turbine section 30, and an exhaust section 32. Intake section 24 includes a fan 34 mounted in a fan case 36. Compressor section 26 includes one or more compressors (e.g., an intermediate pressure (IP) compressor 38 and a high pressure (HP) compressor 40), and turbine section 30 includes one or more turbines (e.g., an HP turbine 42, an IP turbine 44, and a low pressure (LP) turbine 46), which may be disposed in axial flow series. HP compressor 40 and HP turbine 42 are mounted on opposing ends of an HP shaft or spool 48; IP compressor 38 and IP turbine 44 are mounted on opposing ends of IP spool 50; and fan 34 and LP turbine 46 are mounted on opposing ends of a LP spool 52. LP spool 52, IP spool 50, and HP spool 48 are substantially co-axial. That is, LP spool 52 may extend through a longitudinal channel provided through IP spool 50, and IP spool 50 may extend through a longitudinal channel provided through HP spool 48.

During operation of gas turbine engine 22, air is drawn into intake section 24 and accelerated by fan 34. A portion of this accelerated air is directed through a bypass section (not shown) disposed between fan case 36 and an engine cowl (also not shown) to provide forward thrust. The remaining portion of air exhausted from fan 34 is directed into compressor section 26 and compressed by IP compressor 38 and HP compressor 40. The compressed air then flows into combustion section 28 wherein the air is mixed with fuel and combusted by a plurality of combustors 54 (only one of which is shown in FIG. 1). The combusted air expands rapidly and flows through turbine section 30 thereby rotating turbines 42, 44, and 46. The rotation of turbines 42, 44, and 46 (and, therefore, of spools 48, 50, and 52) drives the rotation of HP compressor 40, IP compressor 38, and fan 34, respectively. Finally, after passing through turbine section 30, the air is exhausted through an exhaust nozzle 55 mounted in exhaust section 32 to provide addition forward thrust.

In the exemplary embodiment shown in FIG. 1, an accessory gearbox 56 is mounted to the exterior of gas turbine engine 22. Accessory gearbox 56 includes a housing 58 and a gearbox gear train 60 disposed in the housing 58. A first gear in gearbox gear train 60 is mechanically coupled to HP spool 48 of gas turbine engine 22 by way of a tower shaft 62; a second gear in gear train 60 is mechanically coupled to SDT system 20; and a third gear in gear train is mechanically coupled to electrical generator 64. Although not shown in FIG. 1 for clarity, gear train 60 may also be mechanically coupled to additional line replaceable units (e.g., a hydraulic pump) mounted to the exterior of accessory gearbox 56.

During normal engine operation, HP spool 48 drives gearbox gear train 60, which, in turn, drives electrical generator 64. The electrical output of generator 64 is thus generally determined by the speed of gas turbine engine 22. For this reason, the electrical output of generator 64 may not satisfy the electrical load placed on generator 64 during low-thrust portions of the flight regime, such as ground idle and flight idle. As described in more detail below, SDT 20 addresses this issue by driving accessory gearbox 56, and thus generator 64, by deriving mechanical power from pressurized air drawn from a pressurized air source. This pressurized air source may be, for example, gas turbine engine 22. That is, pressurized air may be provided to an inlet of SDT system 20 by a bleed air flow passage 66 fluidly coupled between SDT system 20 and a section of gas turbine engine, such as compressor section 40. Additionally or alternatively, SDT 20 may also receive pressurized air from one or more bleed air sources 68, such as an auxiliary power unit, a ground power unit, cross-bleed air sources, and/or the like.

Figure 2:
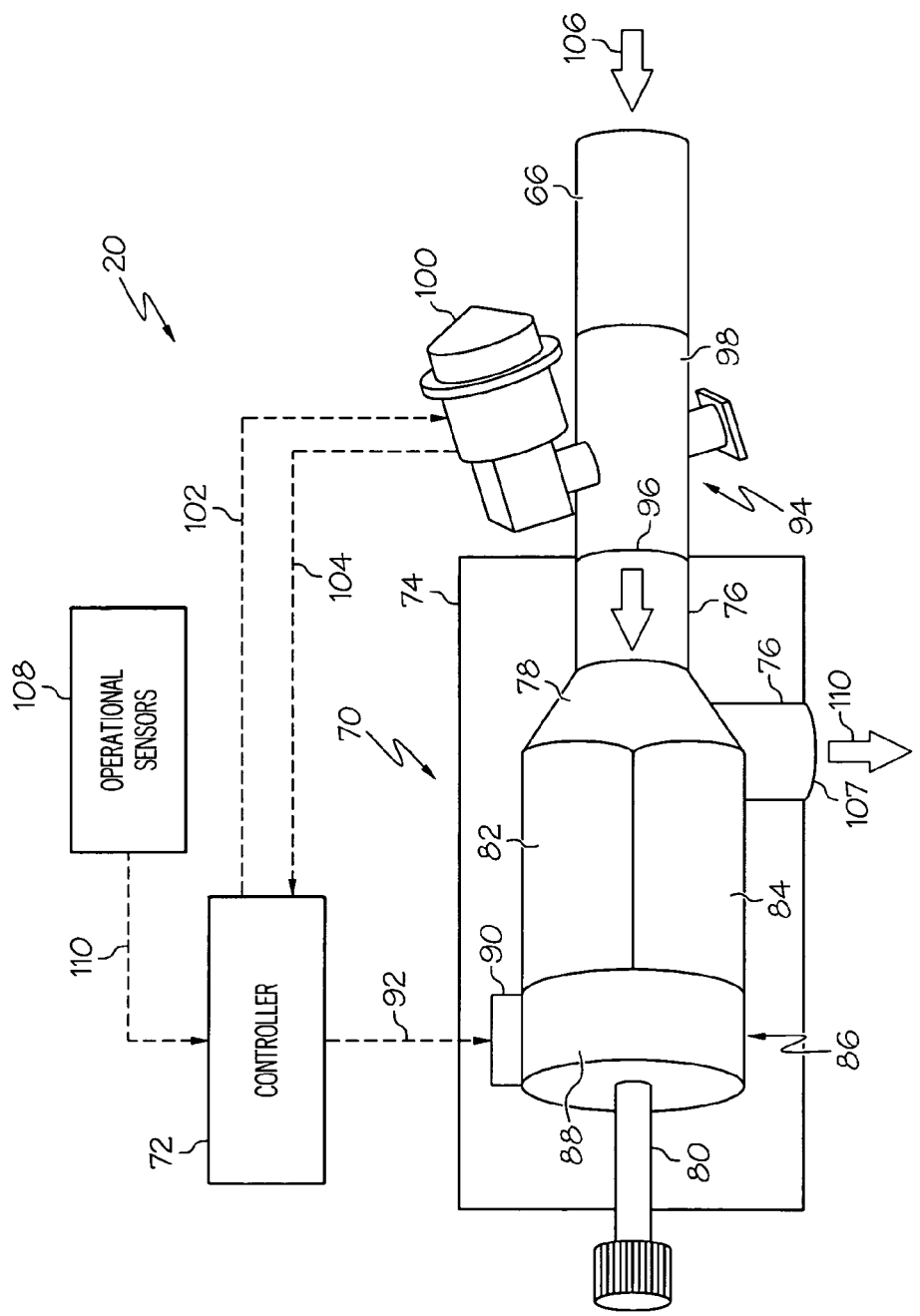
FIG. 2 is a functional schematic the SDT system shown in FIG. 1 including an exemplary bi-modal turbine assembly.

FIG. 2 is a functional schematic view of SDT system 20 in accordance with an exemplary embodiment. In the illustrated example, SDT system 20 comprises a bi-modal turbine assembly 70 and a controller 72. Bi-modal turbine assembly 70 includes a housing assembly 74 through which a turbine assembly flow passage 76 is formed. A turbine wheel 78 is rotatably mounted in housing assembly 74 and positioned so as to be driven by pressurized air flowing through turbine assembly flow passage 76. Housing assembly 74 may be formed from multiple individual housings, including a turbine module housing containing turbine wheel 78. An output shaft 80 is also rotatably mounted in housing assembly 74, and, when SDT system 20 is installed, mechanically engages gearbox gear train 60 (FIG. 1). A first gear train 82 and a second gear train 84 are disposed within housing assembly 74 and mechanically coupled to turbine wheel 78. Notably, and for reasons that will later become apparent, gear train 82 has a gear ratio that is greater than that of gear train 84. Finally, a switching device 86 is mounted within housing assembly 74 between output shaft 80 and gear trains 82 and 84. Bi-modal turbine assembly 70 may further comprise additional components (e.g., bearings) that are well-known in the industry and not shown in FIG. 2 for clarity. For example, bi-modal turbine assembly 70 may further include a non-illustrated lubrication system, which may be self-contained or integrated with the lubrication system employed by accessory gearbox 56 (FIG. 1).

In the exemplary embodiment shown in FIG. 2, switching device 86 comprises a clutch 88 and an actuator 90 (e.g., a solenoid). Clutch 88 is mechanically coupled to output shaft 80, and actuator 90 is operatively coupled to clutch 88. Actuator 90 is configured to cause clutch 88, and thus output shaft 80, to selectively mechanically engage first gear train 82 and second gear train 84. As noted above, gear trains 82 and 84 are each mechanically coupled to turbine wheel 78. Thus, switching device 86 may be utilized to selectively couple first gear train 82 and second gear train 84 between turbine wheel 78 and output shaft 80. As indicated in FIG. 2 at 92, controller 72 is operatively coupled to switching device 86 and specifically to actuator 90. As will be described more fully below, controller 72 is configured to cause switching device 86 to couple: (i) first gear train 82 between turbine wheel 78 and output shaft 80 in a first operational mode, and (ii) second gear train 84 between turbine wheel 78 and output shaft 80 in a second operational mode. Controller 72 may comprise any device suitable for performing this and any other functions described herein. In a preferred embodiment, controller 72 assumes the form of an engine controller, such as a full authority digital engine controller (commonly referred to by the acronym "FADEC").

Referring still to FIG. 2, SDT system 20 further comprises a flow control valve 94 fluidly coupled between an inlet 96 of turbine assembly flow passage 76 and bleed air flow passage 66. Flow control valve 94 includes a flowbody 98, a valve actuator 100 mounted to flowbody 98, and a valve element (not shown) disposed in flowbody 98. The valve element disposed within flowbody 98 is mechanically coupled to valve actuator 100, which is operatively coupled to controller 72. As explained above in conjunction with FIG. 1, bleed air flow passage 66 is supplied with pressurized air from one or more bleed air sources (e.g., a section of gas turbine engine 22). Controller 72 utilizes flow control valve 94 to regulate the airflow received at inlet 96 of turbine assembly flow passage 76. In particular, controller 72 may rate flow control valve 94 between open and closed positions to initiate the first and second operational modes as described in more detail below. In addition, controller 72 may also be configured to receive valve position feedback (indicated in FIG. 2 by dashed line 104) and modulate the position of flow control valve 94 to prevent airflow through flowbody 98 from surpassing a predetermined upper pressure threshold. Alternatively, flow control valve 94 may be equipped with a pressuring-regulating servomechanism. In either case, by limiting the pressure of the airflow through flowbody 98, the output torque or power of turbine assembly 70 may be maintained below a torque or power threshold value.

As explained above, controller 72 is configured to cause switching device 86 to couple: (i) first gear train 82 between turbine wheel 78 and output shaft 80 in a first operational mode, and (ii) second gear train 84 between turbine wheel 78 and output shaft 80 in a second operational mode. In the first operational mode, SDT system 20 may be utilized to initiate the main engine start (MES) of start gas turbine engine 22 (FIG. 1). For this reason, the first operational mode is referred to herein as "Start Mode." When in Start Mode, SDT system 20 may be utilized to initiate MES in the following manner. Controller 72 first commands switching device 96 to mechanically couple first gear train 82 between turbine wheel 78 and output shaft 80. Controller 72 then commands flow control valve 94 to move into an open position. Pressurized air supplied via bleed air flow passage 66 flows through flowbody 98 and into inlet 96 flow passage 76 (indicated in FIG. 2 by arrow 106). The pressurized air flows through the upstream portion of flow passage 76, through turbine wheel 78, through the downstream portion of flow passage 76, and is ultimately exhausted via an outlet 107 of flow passage 76 (indicated in FIG. 2 by arrow 110). This causes turbine wheel 78 (and, therefore, gear train 82, clutch 88, and output shaft 80) to rotate. The rotation of output shaft 80 drives the rotation of a spool of gas turbine engine 22 (e.g., HP spool 48 shown in FIG. 1) and, consequently, the rotation of the turbine mounted thereto (e.g., HP turbine 42). When the rotational rate of the turbine is sufficient to maintain a minimum airflow through gas turbine engine 22, gas turbine engine 22 is started to complete the MES procedure. At some juncture after MES, controller 72 then transitions to the secondary operational mode as described below.

It should thus be appreciated that SDT system 20, when operating in Start Mode, may be utilized to start a gas turbine engine in much the same way as is a conventional air turbine starter (ATS). However, unlike a conventional ATS, SDT system 20 may also operate in a secondary operational mode. In the secondary operational mode, SDT system 20 converts pneumatic power provided by a bleed air source (e.g., a section of gas turbine engine 22) to mechanical power and utilizes this mechanical power to drive electrical generator 64 through accessory gearbox 56. More specifically, in the secondary mode of operation, controller 72 first causes switching device 86 to mechanically couple second gear train 84 (and disengage first gear train 82) between turbine wheel 78 and output shaft 80. Pressurized air supplied via bleed air flow passage 66 then flows through turbine assembly flow passage 76 thereby causing turbine wheel 78 to rotate. As turbine wheel 78 rotates, so too does second gear train 84, clutch 88, and output shaft 80. The rotation of output shaft 80 drives gearbox gear train 60, which, in turn, drives electrical generator 64 (FIG. 1) to produce electrical power as described above.

When accessory gearbox 56 is driven by SDT system 20 in the above-described manner, the electrical output of generator 64 is significantly greater than when generator 64 is solely driven by gas turbine engine 22 when engine 22 is operating at low core engine speeds. SDT system 20 may consequently operate in the secondary operational mode when gas turbine engine 22 at portions of the flight regime generally characterized by low core engine speeds (e.g., flight idle, ground idle, etc.) to increase the electrical output of generator 64. Thus, when operating in the secondary mode, SDT system 20 permits a more efficient energy distribution between the low propulsion requirements of gas turbine engine 22 and the electrical load placed on electrical generator 64. For this reason, the secondary operational mode is generally referred to herein as "Energy Conservation Mode."

As previously stated, controller 72 is configured to operate in Start Mode during MES of gas turbine engine 22 (FIG. 1), and, at some juncture subsequent to MES, controller 72 is configured to transition to Energy Conservation Mode. In certain embodiments, controller 72 may be configured to enter into Energy Conservation Mode when receiving an appropriate command from a cockpit control. In further embodiments, controller 72 may be configured to enter into Energy Conservation Mode controller 72 after a predetermined time period has elapsed subsequent to MES. In still further embodiments, controller 72 may be configured to enter into Energy Conservation Mode after one or more operational parameters of SDT system 20, generator 64 (FIG. 1), gas turbine engine 22 (FIG. 1), and/or other aircraft systems meet certain predetermined criteria as discussed below.

As indicated in FIG. 2, SDT system 20 may further comprise one or more operational sensors 108 operatively coupled to controller 72. As a non-exhaustive list of examples, operational sensors 108 may include: (i) a first sensor configured to monitor a characteristic (e.g., surge valve position) indicative of the electrical load placed on, or the electrical output of, electrical generator 64 (FIG. 1); (ii) a second sensor configured to monitor a characteristic indicative of the core speed of gas turbine engine 22 (e.g., a sensor, such as a monopole or proximity sensor, configured to monitor the rotational rate of tower shaft 62 shown in FIG. 1); and (iii) a third sensor configured to monitor a characteristic indicative of the rotational rate of output shaft 80 (e.g., sensor, such as a monopole or proximity sensor, configured to directly monitor the rotation of shaft 80). As indicated in FIG. 2 at 110, controller 72 may receive signals from operational sensors 108 and transition into Energy Conservation Mode when the operational parameters monitored by sensors 108 meet at least one predetermined criterion. As a specific example, controller 72 may utilize operational sensors 108 to determine engine speed and transition into Energy Conservation Mode when the engine speed exceeds a predetermined engine speed threshold; e.g., between approximately 50% and approximately 100% of the maximum speed of gas turbine engine 22.

Figure 3:
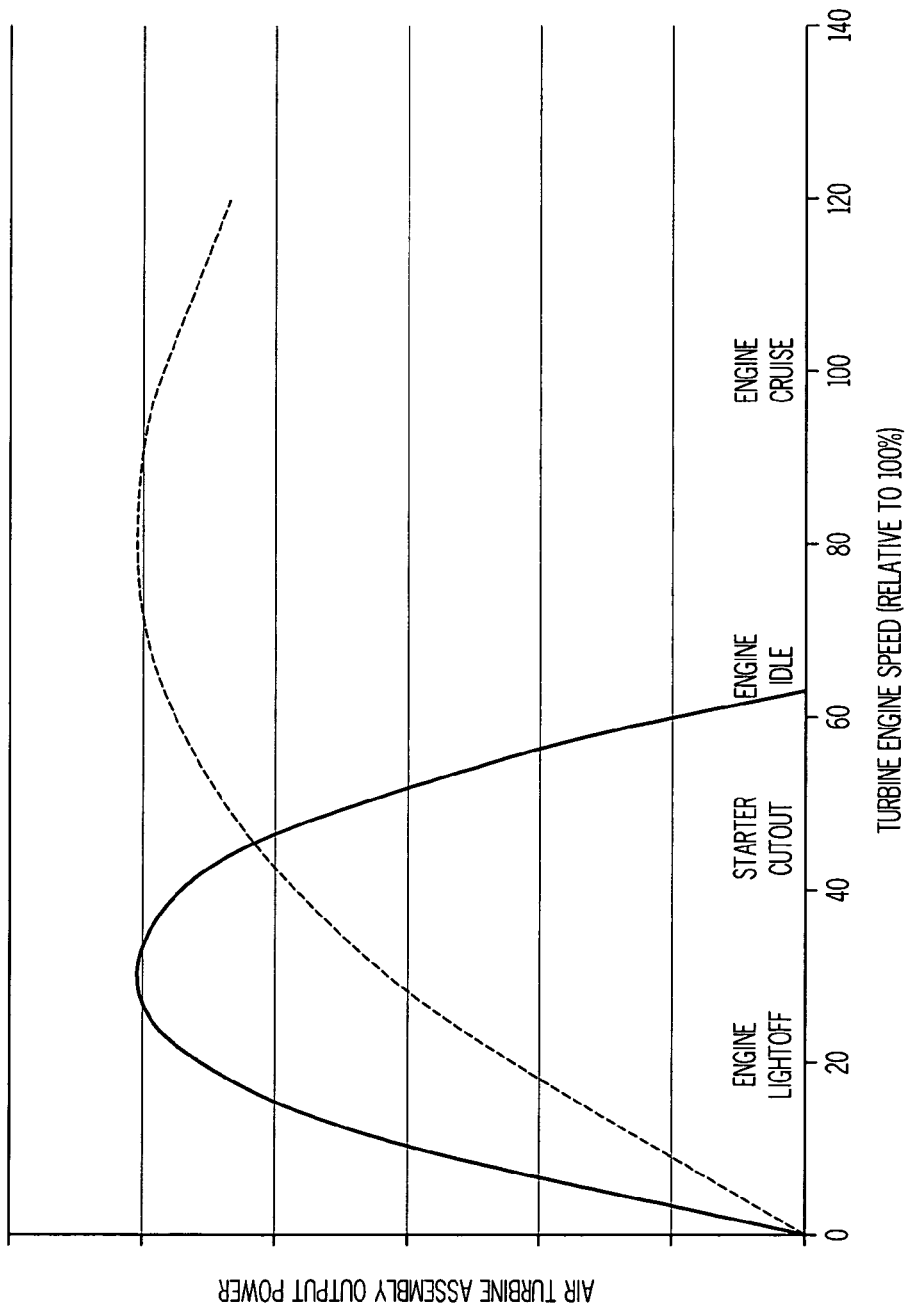
FIG. 3 is a graph illustrating an exemplary Start Mode characteristic and an exemplary Energy Conservation Mode characteristic of the bi-modal turbine assembly shown in FIG. 2 for a range of SDT system output powers (vertical axis) and engine speeds (horizontal axis).

FIG. 3 is a graph illustrating an exemplary Start Mode characteristic (solid line) and an exemplary Energy Conservation Mode characteristic (dashed line) of bi-modal turbine assembly 70 (FIG. 2). The output power of turbine assembly 70 is plotted along the vertical axis and the core engine speed of gas turbine engine 22 (FIG. 1) is plotted along the horizontal axis as a percentage of maximum engine speed. The Start Mode characteristic (solid line) and the Energy Conservation Mode characteristic (dashed line) are a function of the gear ratios of gear trains 82 and 84, respectively. It was previously noted that gear train 82 has a gear ratio that is greater than that of gear train 84. By referring to the Start Mode characteristic (solid line) shown in FIG. 3, it can further be appreciated that gear ratio of gear train 82 is selected such that bi-modal turbine assembly 70 produces peak output power between a first engine speed generally indicative of engine lightoff and a second engine speed generally indicative of flight idle. In a preferred embodiment, the gear ratio of gear train 82 is selected such that turbine assembly 70 produces peak output power between approximately 10% and approximately 50% of the maximum speed of gas turbine engine 22. Furthermore, by referring to the Energy Conservation Mode characteristic (dashed line) illustrated in FIG. 3, it may further be appreciated that that gear ratio of gear train 84 is selected such that turbine assembly 70 produces peak output power between the second engine speed indicative of engine lightoff and third engine speed generally indicative of engine cruise. In a preferred embodiment, the gear ratio of gear train 84 is selected such that turbine assembly 70 produces peak output power between approximately 60% and approximately 100% of the maximum speed of gas turbine engine 22; and, in a more preferred embodiment, between approximately 70% and approximately 90% of the maximum speed of engine 22.

In view of the above, it should thus be appreciated that there has been at least one exemplary embodiment of a starter/drive turbine system that, when operating in a first mode of operation, provides a relatively efficient energy distribution between the low propulsion requirements of a gas turbine engine and the electrical load placed on an electrical generator. When operating in a second mode of operation, embodiments of the starter/drive turbine system are also capable of starting an aircraft's gas turbine engine and are consequently capable of replacing conventional ATS to reduce overall cost, part count, and weight. In the foregoing Detailed Description and in the following Claims, the exemplary turbine assembly may be referred to as a "bi-modal turbine assembly;" however, this phrase by no means implies that embodiments of the turbine assembly are limited to only two modes of operation. Rather, the phrase "bi-modal turbine assembly" is utilized to emphasize that the turbine assembly may operate in at least two modes, namely a Start Mode and an Energy Conservation Mode as described above, in contrast to conventional air turbine starters. Embodiments of the SDT may be formed from multiple modules fixedly joined together. For example, the SDT may include an exhaust module fixedly attached (e.g., clamped) to a turbine module in which the turbine wheel is rotatably mounted.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A bi-modal turbine assembly for use in conjunction with a gas turbine engine, the bi-modal turbine assembly comprising:
   a housing assembly having a flow passage therethrough;
   a turbine wheel rotatably mounted in the housing assembly and positioned so as to be driven by pressurized air flowing through the flow passage;
   an output shaft rotatably mounted in the housing assembly;
   a first gear train disposed in the housing assembly and having a first gear ratio selected such that the bi-modal turbine assembly produces peak output power between a first engine speed generally indicative of engine lightoff and a second engine speed generally indicative of flight idle;
   a second gear train disposed in the housing assembly and having a second gear ratio less than the first gear ratio and selected such that the bi-modal turbine assembly produces peak output power between the second engine speed generally indicative of flight idle and a third engine speed generally indicative of engine cruise; and
   a switching device disposed in the housing assembly and configured to mechanically couple: (i) the first gear train between the turbine wheel and the output shaft in a first operational mode, and (ii) the second gear train between the turbine wheel and the output shaft in a second operational mode.

2. A bi-modal turbine assembly according to claim 1 wherein the switching device comprises:
   a clutch mechanically coupled to the output shaft;
   an actuator operatively coupled to the clutch and configured to cause the clutch to mechanically engage: (i) the first gear train in the first operational mode, and (ii) the second gear train in the second operational mode.

3. A bi-modal turbine assembly for use in conjunction with a gas turbine engine, the bi-modal turbine assembly comprising:
   a housing assembly having a flow passage therethrough;
   a turbine wheel rotatably mounted in the housing assembly and positioned so as to be driven by pressurized air flowing through the flow passage;
   an output shaft rotatably mounted in the housing assembly;
   a first gear train disposed in the housing assembly and having a first gear ratio selected such that the bi-modal turbine assembly produces peak output power between approximately 10% and approximately 50% of the maximum speed of the gas turbine engine;
   a second gear train disposed in the housing assembly and having a second gear ratio less than the first gear ratio and selected such that the bi-modal turbine assembly produces peak output power between approximately 60% and approximately 100% of the maximum speed of the gas turbine engine; and
   a switching device disposed in the housing assembly and configured to mechanically couple: (i) the first gear train between the turbine wheel and the output shaft in a first operational mode, and (ii) the second gear train between the turbine wheel and the output shaft in a second operational mode.

4. A bi-modal turbine assembly according to claim 3 wherein the second gear ratio is selected such that the bi-modal turbine assembly produces peak output power between approximately 70% and approximately 90% of the maximum speed of the gas turbine engine.

5. A starter/drive turbine (SDT) system for use in conjunction with a gas turbine engine deployed on an aircraft, the SDT system comprising:

a bi-modal turbine assembly, comprising:
- a housing assembly having a flow passage therethrough;
- a turbine wheel rotatably mounted in the housing assembly and positioned so as to be driven by pressurized air flowing through the flow passage;
- an output shaft rotatably mounted in the housing assembly;
- a first gear train disposed in the housing assembly;
- a second gear train disposed in the housing assembly; and
- a switching device disposed in the housing assembly and configured to selectively couple the first gear train and the second gear train between the turbine wheel and the output shaft;

a controller operatively coupled to the switching device and configured to cause the switching device to mechanically couple: (i) the first gear train between the turbine wheel and the output shaft in a Start Mode, and (ii) the second gear train between the turbine wheel and the output shaft in an Energy Conservation Mode; and a sensor configured to monitor a characteristic indicative of the speed of the gas turbine engine, the controller operatively coupled to the sensor and configured to transition from Start Mode to Energy Conservation Mode when the speed of the gas turbine engine exceeds a predetermined engine speed threshold between approximately 50% and approximately 100% of the maximum speed of the gas turbine engine.

6. An SDT system according to claim 5 further comprising a flow control valve fluidly coupled to the flow passage and operatively coupled to the controller.

7. An SDT system according to claim 5 further comprising a bleed air flow passage fluidly coupled between the gas turbine engine and the flow passage.

8. An SDT system according to claim 5 wherein the controller is configured to transition from Start Mode to Energy Conservation Mode after main engine start of the gas turbine engine.

9. An SDT system according to claim 5 wherein the controller is configured to operate in Energy Conservation Mode during flight idle.

10. An SDT system according to claim 5 wherein the first gear train has a first gear ratio selected such that the bi-modal turbine assembly produces peak output power between approximately 10% and approximately 50% of the maximum speed of the gas turbine engine.

11. An SDT system according to claim 10 wherein the second gear train has a second gear ratio selected such that the bi-modal turbine assembly produces peak output power between approximately 60% and approximately 100% of the maximum speed of the gas turbine engine.

* * * * *